(12) United States Patent
McLaughlin et al.

(10) Patent No.: US 12,217,095 B1
(45) Date of Patent: Feb. 4, 2025

(54) CREATING AUGMENTED HYBRID INFRASTRUCTURE AS A SERVICE

(71) Applicant: Wells Fargo Bank, N.A., San Francisco, CA (US)

(72) Inventors: Thomas M. McLaughlin, Garnet Valley, PA (US); Lawrence Christopher Flanigan, Fort Mill, SC (US); Joseph M. Allen, Prescott, AZ (US); Glenn D. Ferguson, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 90 days.

(21) Appl. No.: 17/203,525

(22) Filed: Mar. 16, 2021

Related U.S. Application Data

(63) Continuation of application No. 15/689,560, filed on Aug. 29, 2017, now Pat. No. 10,956,224.

(51) Int. Cl.
   *G06F 9/50* (2006.01)
   *G06F 11/30* (2006.01)
   *H04L 41/0806* (2022.01)
   *H04L 43/06* (2022.01)

(52) U.S. Cl.
   CPC .......... *G06F 9/5072* (2013.01); *G06F 9/5077* (2013.01); *G06F 11/3003* (2013.01); *G06F 11/3006* (2013.01); *H04L 41/0806* (2013.01); *H04L 43/06* (2013.01)

(58) Field of Classification Search
   CPC ............... G06F 9/5072; G06F 11/3003; G06F 11/3006; G06F 8/65
   See application file for complete search history.

(56) References Cited

U.S. PATENT DOCUMENTS

| | | | |
|---|---|---|---|
| 6,611,867 B1 | 8/2003 | Bowman-Amuah | |
| 8,233,431 B2 | 7/2012 | Pirskanen | |
| 10,956,224 B1 * | 3/2021 | McLaughlin | G06F 11/3003 |
| 2005/0276174 A1 | 12/2005 | Jang | |
| 2010/0293544 A1 * | 11/2010 | Wilson | G06F 9/4401 718/1 |
| 2012/0159234 A1 * | 6/2012 | Mehta | G06F 11/2035 714/E11.073 |
| 2012/0197800 A1 | 8/2012 | Ross | |
| 2012/0215560 A1 | 8/2012 | Ofek et al. | |
| 2014/0137223 A1 | 5/2014 | Wagner et al. | |
| 2014/0169238 A1 | 6/2014 | Cai et al. | |
| 2014/0172954 A1 | 6/2014 | Salsburg et al. | |
| 2016/0042005 A1 | 2/2016 | Liu et al. | |

(Continued)

*Primary Examiner* — Nicholas P Celani
(74) *Attorney, Agent, or Firm* — Kilpatrick Townsend & Stockton LLP

(57) ABSTRACT

The subject disclosure pertains to provisioning of a hybrid cloud services solution to users. A request for hybrid cloud service can be received from a user by way of a portal. Target users of a hybrid cloud service are identified in response to the received request. Out-of-band touch points can next be determined based on the target users and the request. In one instance, the touch points can be determined based on enterprise or industry rules regarding touch points. Subsequently, a hybrid cloud service solution can be provisioned that integrates the out-of-band touch points. Automatic life cycle management controls can also be provisioned to address patches.

12 Claims, 7 Drawing Sheets

(56) References Cited

U.S. PATENT DOCUMENTS

| | | |
|---|---|---|
| 2016/0043970 A1 | 2/2016 | Jacob et al. |
| 2016/0080422 A1* | 3/2016 | Belgodere .............. G06N 5/048 706/47 |
| 2016/0378518 A1 | 12/2016 | Antony et al. |
| 2017/0192771 A1* | 7/2017 | Gupta ................. G06F 9/45558 |
| 2019/0081722 A1 | 3/2019 | Takeda et al. |

* cited by examiner

3A EMBODIMENT ONE

3B EMBODIMENT TWO

CREATING AUGMENTED HYBRID INFRASTRUCTURE AS A SERVICE

CROSS-REFERENCE TO RELATED APPLICATIONS

This application is a continuation of U.S. patent application Ser. No. 15/689,560, filed Aug. 29, 2017, and entitled "CREATING AUGMENTED HYBRID INFRASTRUCTURE AS A SERVICE," the entirety of which is incorporated herein by reference.

BACKGROUND

The U.S. Department of Commerce National Institute of Standards and Technology (herein "NIST") describes cloud computing as a model for enabling convenient, on-demand network access to a shared pool of configurable computing resources that can be rapidly provisioned and released with minimal management effort or service provider interaction. NIST goes on and notes that cloud computing promotes availability and is composed of five essential characteristics (on-demand self-service, broad network access, resource pooling, rapid elasticity, and measured service): According to NIST, cloud computing traditionally comes in three service models (Software as a Service ("SaaS"), Platform as a Service ("PaaS"), and Infrastructure as a Service ("IaaS")); and, traditionally is deployed in one of four deployment models (private cloud, community cloud, public cloud, or hybrid cloud).

Critically, per NIST, government and industry must begin adoption of this technology in response to difficult economic constraints. During this adoption process, NIST warns that cloud computing technology may challenge many traditional approaches to datacenter and enterprise application design and management. However, adoption alone is not enough, and the Executive Summary of the U.S. Government Cloud Computing Technology Roadmap, Volume 1, Release 1.0 (Draft) in November 2011 characterizes cloud computing as a "profound economic and technical shift (with) great potential to . . . stimulat[e] innovation in IT solutions."

SUMMARY

The following presents a simplified summary in order to provide a basic understanding of some aspects of the disclosed innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

While traditionally, in the context of cloud computing, Infrastructure as a Service (IaaS") consumers have been system administrators, the disclosed innovation provides improvements in methodologies and delivered goods that expand that traditional consumer base beyond mere system administrators. Synergistic effects of the innovation provide increased utility for an expanded user base. To this end, the innovation does not hew to strict traditional or siloed views of what constitutes IaaS and instead discloses systems and methods that provide improvements to technology and methodology of provisioning technical solutions in a cloud computing environment with an augmented hybrid IaaS. It should be appreciated that references to the disclosed innovation as an IaaS are not to be limited to the U.S. Department of Commerce National Institute of Standards and Technology ("NIST") definition.

Traditional IaaS does not provide for intelligently customized virtual machine environments, and often leave too many manual activities in hands of a traditional consumer after a "compute stage" (or solution) has been provisioned. Innovation in an area of providing an augmented technical environment for target users is disclosed. In an embodiment, a target user may be an internal business unit or application development team. For such a target user, a traditional IaaS product would still be lacking many items and would require an abundant amount of post spool up manual effort and additional/continuing oversight for a product to be truly usable as a platform for the user. Many items may need to be accounted for, and may include for example details about CPU, storage, access, back-ups and "ready-to-run" steps. Other items may include intellectual property (or other) licenses, load balancing, and optional "software titles" or layered products within a server environment. Further such other concerns such as continued management of connectivity and firewalls may be required by a consumer after a traditional IaaS has been provided. The innovation provides integration of out of band items such as these and others into most any ongoing or "true" technical solution.

The innovation disclosed and claimed herein, in one aspect thereof, includes methods, systems, and computer program products that enable provisioning of hybrid cloud services. An example method may include receiving a request for a hybrid cloud service from a predetermined user, submitting the request to an approval process that upon approval, provisions a hybrid cloud service solution to the hybrid cloud service request that integrates out of band touch points.

An example system that provisions augmented hybrid cloud services may include a portal component (which may include an integration layer component and a provisioning component), that may be accessed by a predetermined user. The system may also include a delivery component that delivers a fully compliant and secure hybrid cloud service solution, and a lifecycle component that provides ongoing patching and compliance throughout a lifecycle of a hybrid cloud services solution.

An example non-transitory computer program product may be a machine-readable medium having instructions for a hardware processor. The instructions, when executed, may receive a request for a hybrid cloud service from a predetermined user, submit the request to an approval process that upon approval, provision a hybrid cloud service solution to the hybrid cloud service request that integrates out of band touch points, deliver the hybrid cloud service solution and apply lifecycle management of the hybrid cloud service solution outside of the predetermined user's control.

For these considerations, as well as other considerations, in one or more embodiments, a system for cloud service provisioning can include a memory to store computer-executable instructions and a processor, coupled to the memory, to facilitate execution of the computer-executable instructions to perform operations.

In another embodiment, a non-transitory computer-readable medium configured to store instructions, that when executed by a processor perform operations including cloud service provisioning.

To accomplish the foregoing and related ends, certain illustrative aspects of the innovation are described herein in connection with the following description and the annexed drawings. These aspects are indicative, however, of but a few of the various ways in which principles of the disclosed innovation may be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
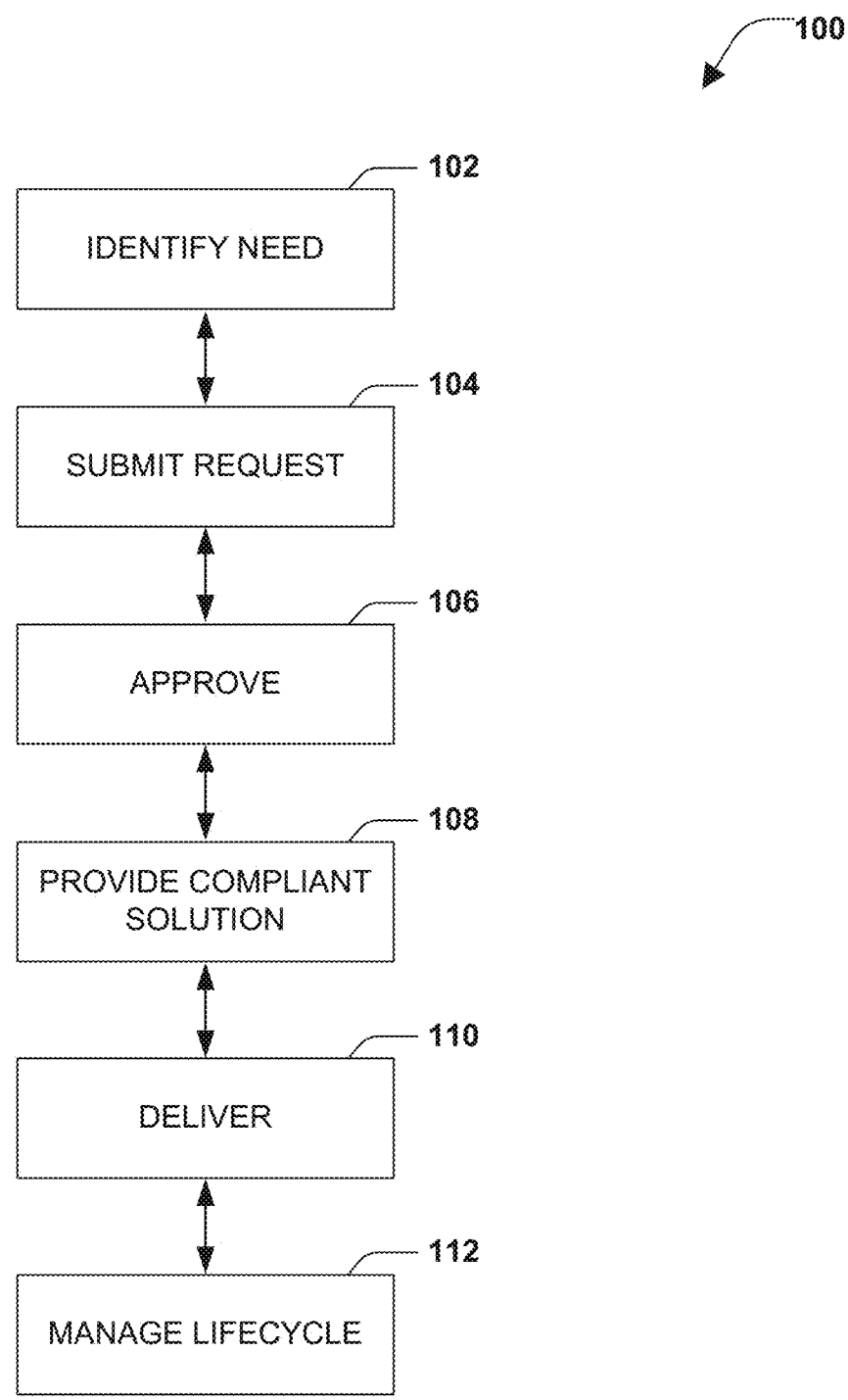
FIG. 1 is an illustration of an example method in accordance with one or more aspects of the disclosure.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, the claimed subject matter can be implemented as a method, apparatus, or article of manufacture using programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. It is appreciated that embodiments are presented as a specific, non-limiting, examples of the innovation. Other embodiments are contemplated as well and intended to be included within the scope of this disclosure and claims appended hereto.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

With reference now to the figures, FIG. 1 is an illustration of an example method 100 in accordance with one or more aspects of the disclosure. Method 100 is an illustration of an example of an augmented hybrid cloud service provisioning, according to one or more embodiments. In contrast to the outline of cloud services by the U.S. Department of Commerce National Institute of Standards and Technology ("NIST"), the disclosed innovation is not siloed into one of the three traditional cloud service categories of Software as a Service ("SaaS"), Platform as a Service ("PaaS"), and Infrastructure as a Service ("IaaS"). At 102, a user, for example a client business application owner, presents a need or a desired scope stating, "I need infrastructure to support my application development efforts," or "I need infrastructure to support the scope of my effort." It is to be appreciated that this need is related to a technical area of cloud computing (as noted by NIST) and this innovation is directed to technical improvements in development systems themselves. It is also to be appreciated that a user may be an individual or a team of people. It is to be appreciated that Integration Layer component 206 (to be discussed in greater detail in regard to FIG. 2) may parse the need, apply logic and provide supplemental information requests to the user.

At 104 an electronic request is submitted. The electronic request may be submitted through an "Infrastructure Services Portal" or ("ISP"). For example, ISP as will be discussed in reference to FIGS. 3 and 4 may be an ISP used. It is to be appreciated that the term portal and "Infrastructure Services Portal" are used interchangeably and that an augmented hybrid service is not constrained to a traditional IaaS as set forth by NIST. The request may be for hybrid cloud services that may include or may comprise a majority of infrastructure solutions, and services may be classified into categories of "standard" or "approved non-standard." These categories may be set and defined differently for different target users. The categories may be set for example by such parameters as users belonging to a group of targeted internal development teams, or users belonging to a group of targeted external third parties. The electronic request may be in a form of a controlled offering of menu selections, and may provide guidance to a user such that for an item being requested, inputs necessary to ensure integration point data will be sufficient for most any predetermined rule sets for the particular predetermined user.

At 106, the request is processed and either approved or declined. Approval may depend on a number of factors, for example, on a financial basis of the request or a related project. Factors for approval are not to be considered limiting. It is to be appreciated that approval factors may be highly customized and may include iteration check points. By this, it is understood that in some embodiments, approval may be granted in stages.

At 108, provisioning of a technical solution is accomplished. The provisioning may be according to most any of the systems disclosed herein, for example, the system of FIG. 2, as will be discussed. It is to be appreciated that the provisioning includes pertinent touch points of integration, such as security compliance, configuration compliance, asset management, software entitlements, business continuity and financial reconciliation. Touch points may be, in one example, hyperlinks or pointers to connected and interacting systems. It is also to be appreciated that the pertinence may vary in degree and substance, depending on the target user engaged in the method. For example, users of a nature of an internal business unit may have more extensive integration of touch points or different touch points than may a user of a nature of an independent third party.

At 110, delivery is accomplished. What is delivered is a fully compliant and secure hybrid cloud solution. It is to be appreciated that elements of the ensured fully compliant and secure solution may be finalized with delivery or with installation of the solution after delivery. It is to be appreciated that certain integration steps might occur after delivery (for example, post-delivery installation may require scale up and final integration into other live systems). Since integration points have been taken care of and ongoing maintenance of a platform solution are seamless to a user, the delivered solution comprises synergistic benefits beyond those that a user might obtain with a solution obtained through a traditional IaaS, followed by separate management actions. For example, a predetermined user from an internal business source would have an entirety of business touch points accounted for, even touch points that the user may not be aware of, and may typically not be called upon to be aware of.

Step 112 indicates an automated ongoing patching and compliance throughout the lifecycle of the technical solution. Similar to the delivery step, it is to be appreciated that certain steps may be actualized on an ongoing or intermittently timed basis after delivery of the technical solution (for example, patching and the window of patching activity may occur after provisioning of the technical solution and during the remainder of a user's efforts). It is to be appreciated that the disclosed innovation enjoys synergistic effects not only because these post-solution provisioning items are controlled outside of a user's actions or concerns, but that the inclusion of these items earlier in the method ensures that most any related touch points have been integrated properly.

In some embodiments, an option may be provided to users to opt out of a lifecycle management portion of an end to end process flow. In such a case, it is to be appreciated that hybrid cloud solutions may include suitable notifications at a delivery step 110, at predetermined intervals during a remainder of a solution lifecycle, or both. In some embodiments the ability to modify an initial "opt-out" choice may be provided. Likewise, in some embodiments, the ability to "opt-out" after an initial "opt-in" may be provided.

Figure 2:
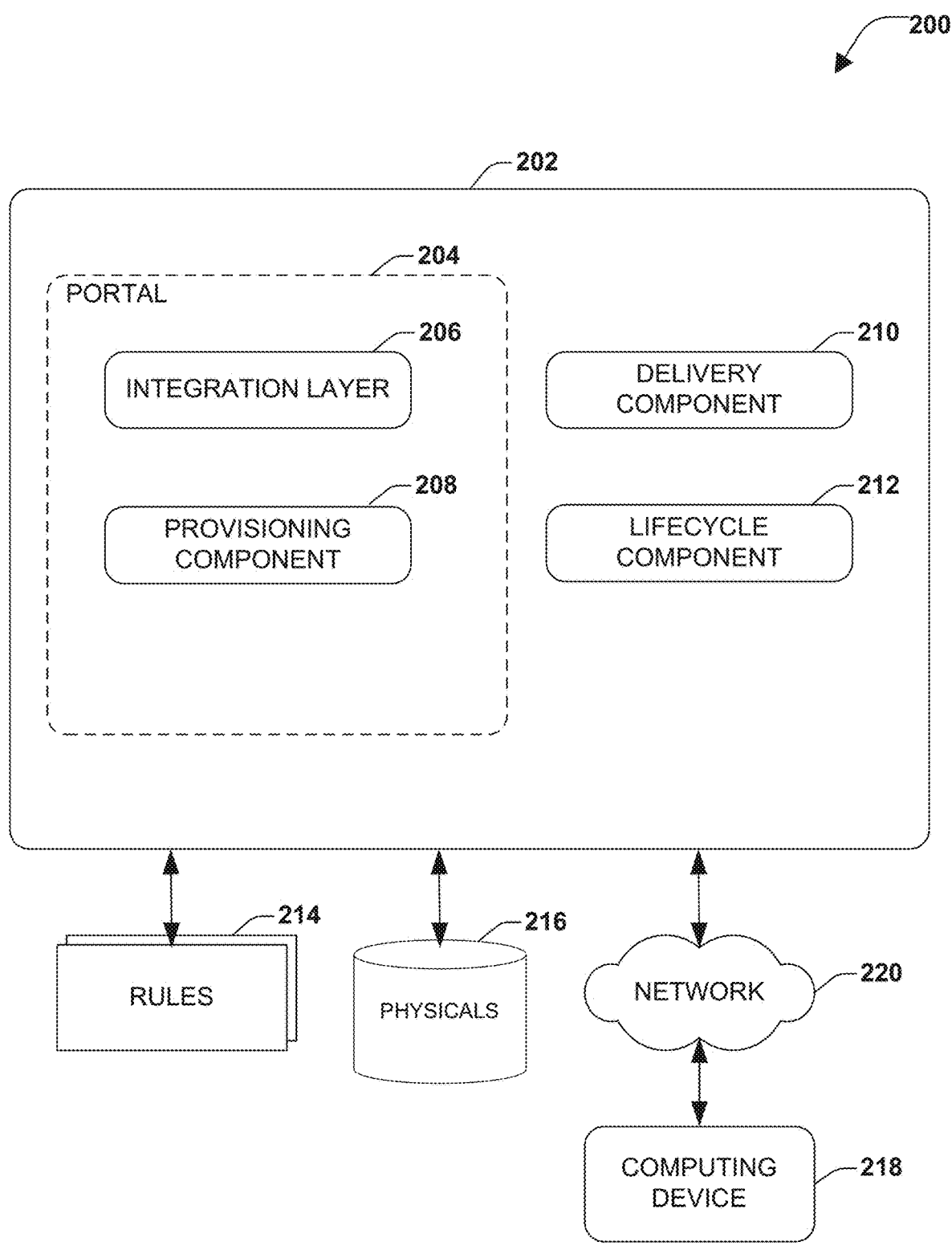
FIG. 2 is an illustration of example system components, according to one or more embodiments.

Turning now to FIG. 2, illustrated are example system components, according to one or more embodiments 200. In an embodiment 200, a system may be comprised of a set of components 202 that may be in communicative connection and other components that may interact with the set of components 202. The set of components 202 may comprise a portal component 204, an integration layer component 206, a provisioning component 208, a delivery component 210 and a lifecycle component 212. It is to be appreciated that the portal component 204 may comprise the integration layer component 206 and the provisioning component 208 (as shown), or in certain embodiments, the components may be separate from, but in communicative connection with, the portal component 204.

In an embodiment, the innovation provides an integration layer component 206 that existing application program interfaces ("APIs") simply lack or are otherwise inefficient. The integration layer component 206 provides for integrating business level compliance factors and eliminates a need for subsequent point to point integration that most any new virtual machine being rolled out would need subsequent user accommodation in a traditional IaaS service offering. It is to be understood that the integration layer component 206 may be modified for various groups of targeted users. In an embodiment, for example in heavily regulated environments as in the financial industry or the medical industry, the integration layer component 206 may be dedicated in substantial part to compliance items that carry away a large downstream load that traditionally may have concerned users.

It is to be appreciated that the NIST Cloud Computing reference architecture and the US Government Cloud Computing Technology Roadmap each teach a different structure and system in its taxonomy and roadmap requirements. Differences exist in the disclosed innovation at multiple levels, from Level 1: Roles and Level 2: Activities; and because of these differences, Levels 3 and 4 Components and Sub Components also are not as taught or suggested by NIST.

At the Level 1: Roles, the disclosed innovation breaks through the siloed approach of NIST in relation to the roles of cloud broker, cloud service provider and cloud service consumer. At the Level 2: Activities, the NIST silo is further distanced, as the lines between PaaS and IaaS are purposefully blurred. Elements of service provision, service orchestration and cloud services management do not follow the NIST guidelines and follow a different innovative path. It is to be appreciated that other elements covered by the NIST taxonomy, such as for example, Security and Privacy (not shown) at Level 2: Activities of the NIST taxonomy are to be considered to be part of the disclosed innovation as would be understood by a person having ordinary skill in the art. For another example, the role of Cloud Auditor (not shown) and the components and subcomponents related to portability/interoperability (for data and system portability, and services interoperability) are to be considered as part of the disclosed innovation as would be understood by a person having ordinary skill in the art.

In another example, the disclosed innovation varies from traditional Iaas activity in an area of software stack and provider/consumer scope of control. The disclosed innovation provides for a level of control in order to ensure integration points in a final delivered solution. The level of control is managed outside of the typical control of an end user. This change in control alters the traditional software stack and control splits that occur in a standard IaaS arrangement. Likewise, traditional PaaS arrangements are also not followed. The hybrid innovation provides a hypervisor layer different than the taxonomy as provided by NIST. The innovation changes this model by not ceding control of configurations, at least at a level of distinction that a "suite" provided to a computer application development team has their "working base" prepped from. Instead, provisions are at a state of full compliance with predetermined target user rule sets, secure, and with future maintenance management items set. This structure contrasts significantly with SaaS and PaaS clouds in which many of these issues are not handled transparently for targeted users, and traditional structures grant very significant control over the software stack to targeted users, thereby mandating that targeted users must take on the responsibility to operate, update, and configure these traditional computing resources for security and reliability. The disclosed innovation avoids this and similar issues, and provides greater synergy by incorporating integration touch points that a user may not even be aware of.

In an embodiment, an integration layer component 206 may build, into a front end of a disclosed solution, control items related to delivery component 210 and lifecycle component 212. At the front end, patching and timing windows for patching may be designated, and users may not need to be concerned with managing this aspect on their own. In some embodiments, an ability to opt out of such control may be offered, and suitable notation that provided solutions do not cover patches may be provided. In some embodiments the ability to modify an initial "opt-out" choice may be provided. Likewise, in some embodiments, the ability to "opt-out" after an initial "opt-in" may be provided.

In embodiments, an integration layer component 206 may provide a degree of self-management. It is to be understood that self-management controls may be integrated into the integration layer component 206 or may be a stand-alone component that integration layer component 206 interfaces with.

It is also to be appreciated that integration layer component 206 may be configured for selected target users to ensure particular enterprise wide compliance. In embodiments in which users are limited to be associated with a specific entity, enterprise-wide compliance may thus be assured, and system wide integration points would be seamlessly provided. The disclosed innovation thus differentiates from traditional IaaS by removing and eliminating out of band touch points that a user would be responsible for in a post-solution-provision timeframe, for example, future maintenance may no longer be a concern for a user. In another example, moving standards for credit card processing into a "bottom half of a guaranteed stack" provides users that may be concerned with computer application development ready platform for new improvements and remove integration aspects of legacy features. It is to be appreciated that this type of service/product may also be configured for different target users, for example, third parties, or may be configured to integrate third party remedies with ensured compliance to a hybrid cloud service solution.

The disclosed innovation provides for an atomic transaction tied to predetermined policies and regulations that may apply to different sets of users. Not only does this type of front loading eliminate later manual touch points, such a system is made more robust as integration of various touch points is ensured prior to a user (for example, the computer application development team) even begins to create new applications in a provisioned platform. It is to be appreciated that integration layer component 206 may perform combinations of multiple services into one or more new services.

In one or more embodiments, provisioning component 208 may provide various aspects of provisioning/configuration of a hybrid cloud service solution. Aspects may include rapid provisioning (automatically deploying cloud systems based on requested service/resources/capabilities), resource changing (adjusting configuration/resource assignment for repairs, upgrades and joining new nodes into a cloud service), monitoring and reporting (discovering and monitoring virtual resources, monitoring cloud operations and events and generating performance reports), metering (providing a metering capability at a predetermined level appropriate to a hybrid cloud service solution), and third party license agreement management (which may include software license agreements, and which may encompass contract definition, monitoring and enforcement according to defined policies). In one or more embodiments, provisioning component 208 may involve: database licensing, internal or external Technology Standards Center ("TSC"), Datacenter Procurement Suite ("DPS"), Path Computation Element ("PCE")—OpenStack or Puppet, Cloud Integration Hub, Environment Modelling Center ("EMC") Avamar, Local Network Service ("LNS") Request System, New BuildTool ("NBT"), Network Security Service ("NSS") Workflow Management System ("@Work"), uDeploy, Virtual Machine Software ("Vmware vCenter"), Automated Build Tool ("ABT"), DevicePro, Hewlett-Packard Server Automation ("HP SA"), Hewlett-Packard Enterprises ("HPE") Solutions Desk, NetZoom, and Symantec NetBackup. It is to be appreciated that both internal and external (third party) cloud service components may be provisioned by provisioning component 208.

It is to be appreciated that delivery component 210 and lifecycle component 212 may operate along lines as understood by a person having ordinary skill in the art, with additional modifications to accommodate the augmented hybrid nature of the disclosed innovation. Delivery component 210 may be a component outside of the portal 204, but still within the control of system 202. Delivery component 210 assures that delivery is accomplished. What is delivered is a fully compliant and secure solution. It is to be appreciated that elements of the ensured fully compliant and secure solution may be finalized with delivery of a hybrid cloud services solution or with installation of the solution after delivery. Delivery component 210 acts under control as set within portal 204 and ensures that seamless and augmented provisioning of the disclosed innovation is met even after the solution is delivered. It is to be appreciated that certain integration steps might occur after delivery (for example, post-delivery installation may require scale up and final integration into other live systems). Since integration points have been taken care of and ongoing maintenance of the platform solution are seamless to a user, the delivered hybrid cloud service solution contains synergistic benefits beyond those that a user might obtain with a solution obtained through a traditional IaaS followed by separate management actions. Synergistic benefits may accrue, for example as hybrid cloud service solution may have entire business touch points accounted for, even touch points that a user may not be aware of and may typically not be called upon to be aware of.

In a similar manner, lifecycle component 212 may ensure that ongoing patching and compliance throughout a lifecycle of a technical solution stays within parameters as set in portal 204. It is to be appreciated that certain steps may be actualized on an ongoing or intermittently timed basis after completion of delivery (for example, patching and a timing window of patching activity may occur after a provisioning and during a remainder of a user's efforts). It is to be appreciated that the disclosed innovation enjoys synergistic effects not only because these post-delivery items are controlled outside of a user's actions or concerns, but that inclusion of these items earlier in a provisioning process ensures that most any related touch points have been integrated properly.

In some embodiments, an option may be provided to users to opt out of the lifecycle management portion of an end to end process flow. In such a case, it is to be appreciated that a hybrid cloud services solution may include suitable notifications through delivery component 210 or lifecycle component 212 at predetermined intervals during a remainder of a solution lifecycle.

Rules 214 may be associated with a set of components 202. It is to be appreciated that Rules 214 may be predetermined and may align with groups or categories of target users. Rules 214 may also be updated from time to time. According to various target user characteristics, Rules 214 may vary from company-wide or enterprise-wide concerns to industry-wide concerns, and may include such things, as example, existing legal rules for an industry. It is to be appreciated that rules may be set for various groups and for interactions between various groups.

Physicals 216 may also be associated with a set of components 202. Physicals 216 may include traditional items that a traditional PaaS or Saas consumer service would include. For PaaS attributes, a suitable third party PaaS solution, such as Microsoft Azure, may be integrated into a hybrid solution of the disclosed innovation. Physicals may include hardware such as for example Computers (CPU, memory), network (router, firewall, switch, network link and interface), storage components (hard disk), and other physical computing infrastructure elements. Physicals may also include facility items such as for example: Heating, Ventilation, and Air Conditioning ("HVAC"), power, communications, and other aspects of a physical plant.

System 200 may be accessed by users though computing devices 218 of users through a network 220, which may be in communicative connection with the set of components 202. It is to be appreciated that Rules 214 and Physicals 216 may be in direct communicative contact with Network 220 and Computing Device 218.

Figure 3:
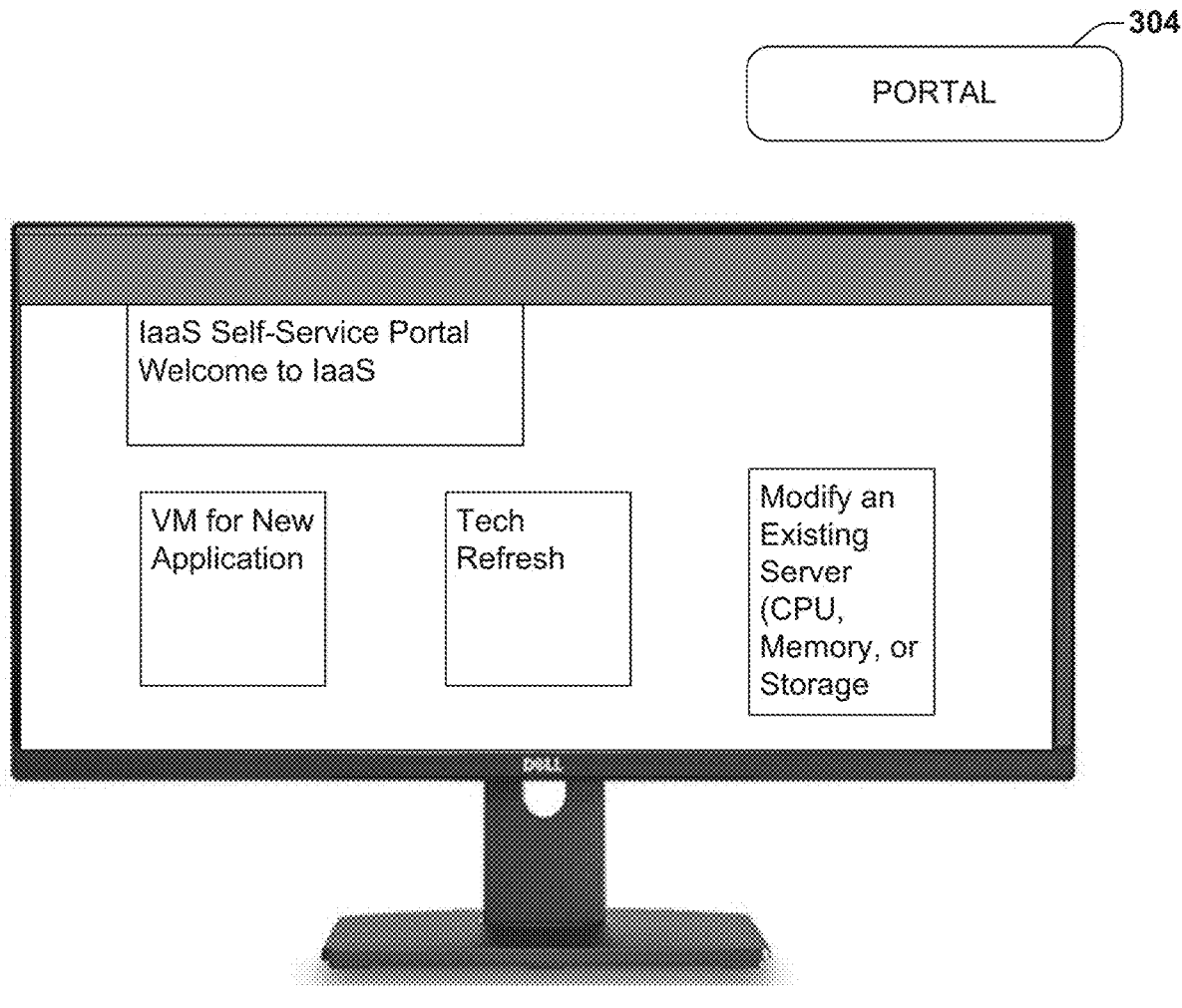
FIG. 3 is an illustration of example system components, according to one or more embodiments.
Figure 3:
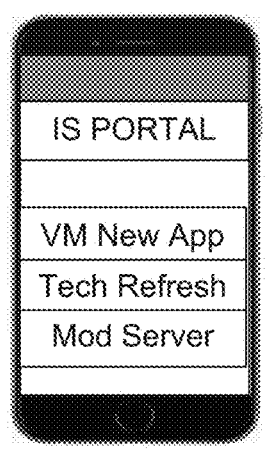
Figure 4:
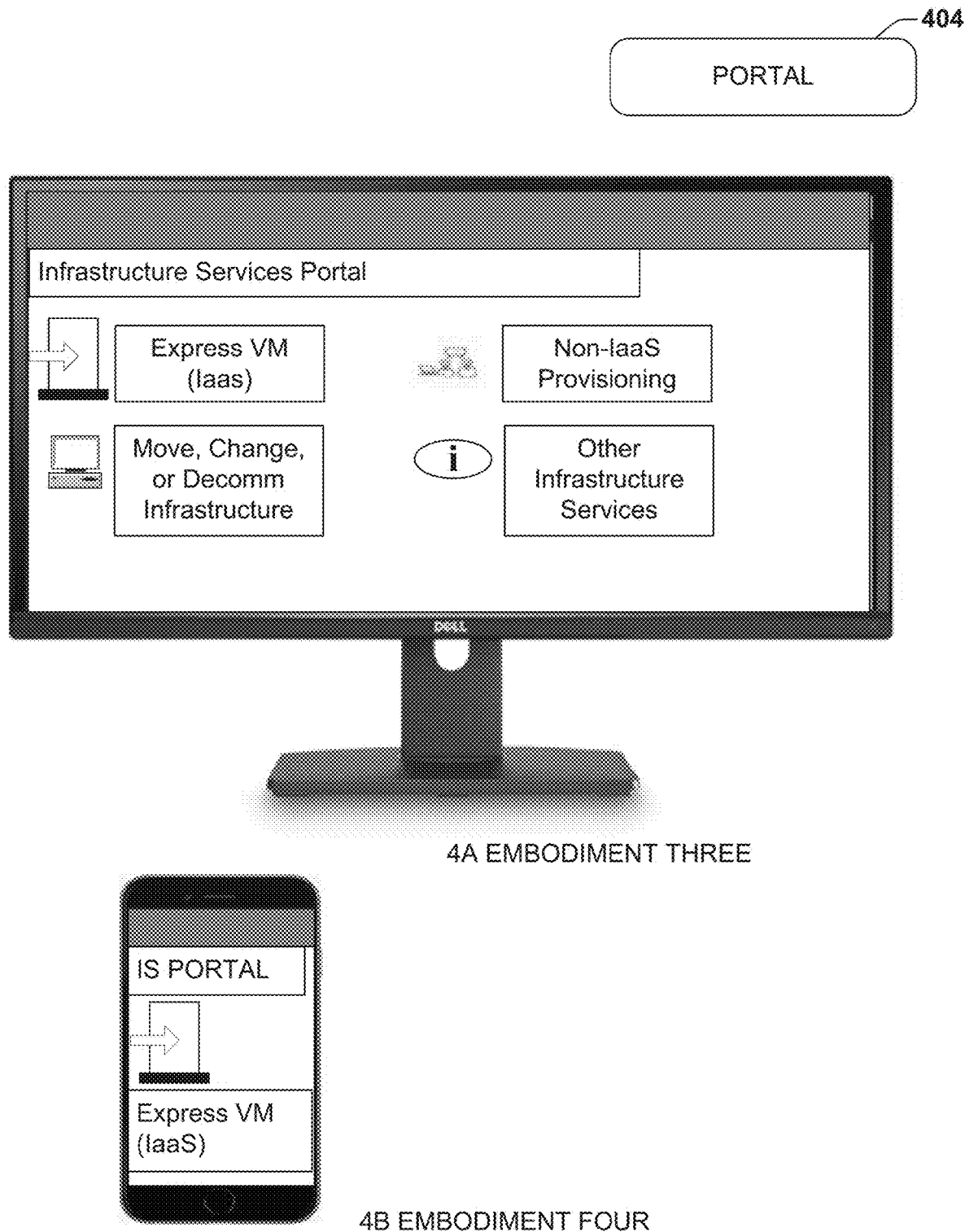
FIG. 4 is an illustration of example system components, according to one or more embodiments.

Turning now to FIG. 3, illustrated is an example system component according to one or more embodiments 300, specifically pictured are example embodiments of how portal 304 may appear to a user. In FIG. 3A, embodiment one shows a portal component as an interactive web page on an example personal computer screen. In FIG. 3B, embodiment two shows a portal component as an interactive smartphone or tablet application. It is to be appreciated that the portal component 304 is not limited by these embodiments or by interactive controls presented therein. FIG. 4 provides additional embodiments related to portal 404 and embodiments 400. In FIG. 4A, embodiment three shows a portal component as an interactive web page on an example personal computer screen. In FIG. 4B, embodiment four shows a portal component as an interactive smartphone or tablet application. It is to be appreciated that the portal component 404 is not limited by these embodiments or by interactive controls presented therein.

Figure 5:
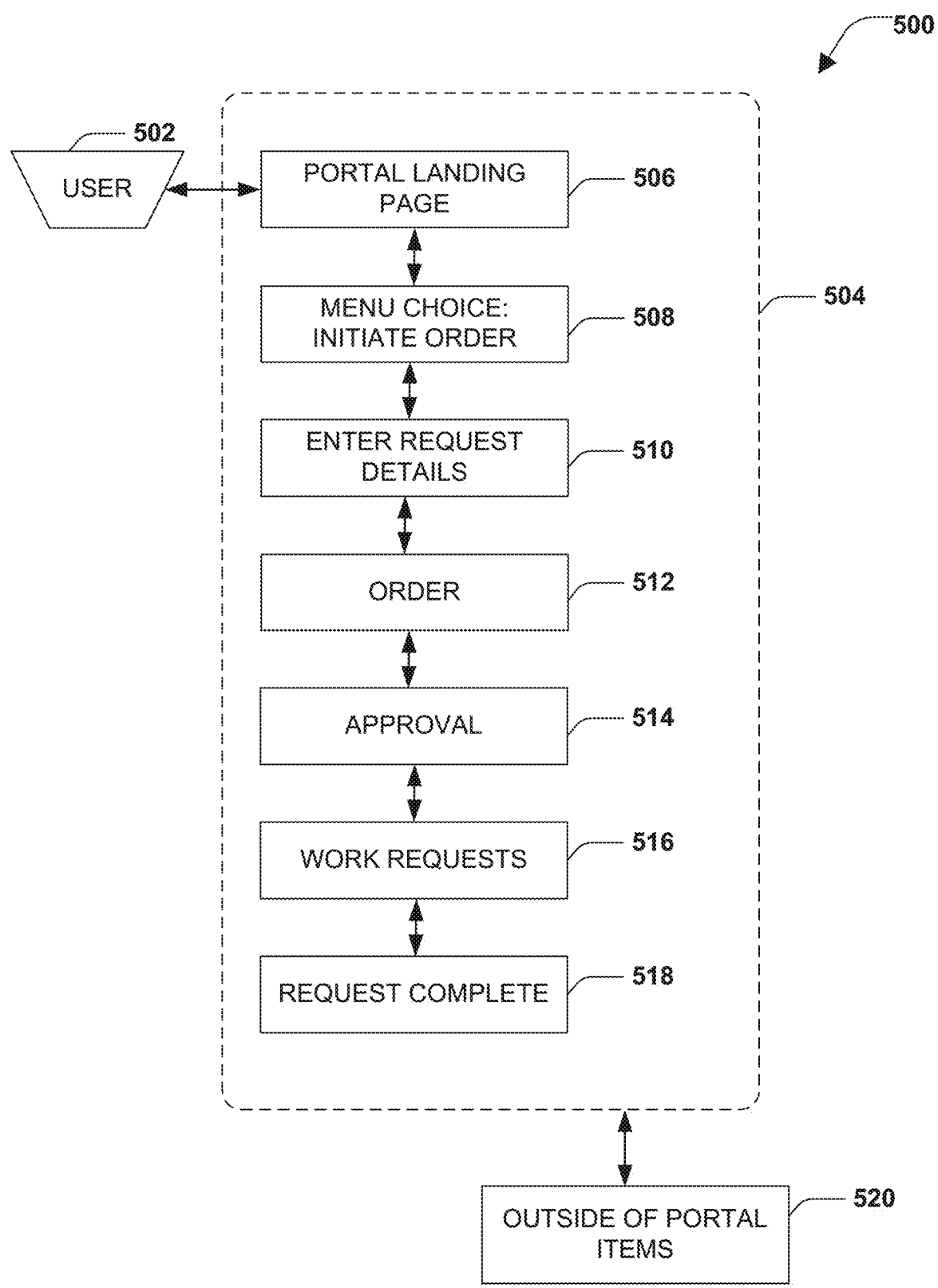
FIG. 5 is an illustration of an an example method in accordance with one or more aspects of the disclosure.

FIG. 5 is an illustration of an example method 500 in accordance with one or more aspects of the disclosure. The method 500 is an illustration of an example an augmented cloud service provisioning, according to one or more embodiments. At 502, a user, for example a client Business Application Owner, interacts with a portal 504, which may for example, be a portal such as discussed in relation to FIGS. 2, 3 and 4. Portal 504 may present a landing page 506 with menu controls offering a selection of services. It is to be appreciated that the selection of services may offer one or more embodiments of methods disclosed herein and may also offer other services both related to an unrelated to the disclosed innovation. Method 500 may continue by accepting inputs of an initiate order 508. An initiate order 508 may comprise a section for request details to be entered at 510. It is to be appreciated that other menu choices (not shown) may be available. For example, the creation of orders and tracking for other infrastructure services may be provided through alternative menu choices. An embodiment may include a menu choice for providing visibility or tracking or monitoring of the entire workflow regardless of any automated updates. Some embodiments may provide for default monitoring, backup capabilities and access capabilities. Request details may vary by target user and may include items such as "Requestor" (which may be auto-populated), "On behalf of," Assessment Unit ("AU") (which may be derived from above information), "Application ID," "App Owner" (which may be derived from Application ID and auto-populated), "App support team" (which also may be derived from Application ID and auto-populated), and "Planner" (which may be derived from above), and "Approver" (which may be derived from requestor or 'on behalf of'). It is to be further appreciated that the entering of request details at 510 may create an asset record (not shown).

Once information has been obtained, Order 512 may be undertaken. In an embodiment, order 512 may be comprised of four blocks, each with subparts (not shown). Order 512 may also comprise a cascading series of options with request forms per layer of option (not shown).

Continuing with the embodiment, a first of four blocks of order 512 may be "Select Compute Details." "Select Compute Details" may comprise subparts such as quantity, size (for example from a specified list), operating system, authentication method (which may be derived from OS), authentication domain, Server Access Control BoKS® Host Group (if an option of Uniplexed Information and Computing System ("UNIX") has been chosen), site, environment, and server function.

A second of four blocks of order 512 may be "Select Optional Services." "Select Optional Services" may comprise selections such as Domain Name System ("DNS"), load balancing, firewall, network, and certificate handling.

A third of four blocks of order 512 may be "Select Storage/Backup." The "Select Storage/Backup" may comprise option selections of storage type (for example, VMWare Disk), storage amount (in GB per disk), backup policy, backup amount (GB), and file system layout.

A fourth of four blocks of order 512 may be "Select Software." The "Select Software" block may comprise options such as software name, Time Stamp Counter Identification ("TSC ID") (which may be derived from above), version (if not the latest), release, patch level, and option flagging whether a custom quote may be desired.

Order 512 may also comprise a cascading series of options with request forms per layer of option. The cascading decision blocks may include, for example: "CPU/Memory Upgrade?;" "Storage Add/Remove?;" "Software Add?;" "Decomm VM?;" and "Other?". It should be appreciated that this cascading series may be open ended or may be able to be modified to include specific target user items or modifications that may extend beyond specific target users.

Once order 512 is completed, the next step in method 500 is the step of approval 514. In an example, approval 514 may comprise one action block, one decision block, and two subsequent actions from the decision block. The action block may be "review order, cost & submit for approval." The decision block may be "AU/App Owner approve?" An affirmative response may lead to an email approval notification to requestor, and an initiation of a next step. A negative response may lead to an email reject notification to requestor. In some embodiments, a reject notification may highlight a rational of the rejection. In some other embodiments, a reject notification may provide suggestions or recommendations to the requestor.

Upon an affirmative response from approval 514, the method proceeds to generate individual work requests at work requests 516. At this step, actions as captured in order 512 are initiated, and a solution set for all services may be requested. The steps of fulfilling requests may be processed in parallel. Fulfillment may note whether a request for a particular aspect of a solution has been made, and in some embodiments, providing status updates as the fulfillment of individual aspects proceeds. Items processed in parallel may comprise, for example: compute, storage, backups, server access, server configuration, software, configure middleware, load balancing, firewall rules, certificates, network connectivity, and DNS.

Step request complete 518 may be a final fulfillment step and may in some embodiments be represented by a decision block "All work requests complete?" The decision block may have a self-looping "no" path and a 'yes' path to a communication to requestor with post cloud service instructions and links.

At this point, the method has completed its steps within a portal, for example, portal 204 as discussed in FIG. 2 or portal 304 or portal 404 as shown in embodiments of FIG. 3 or 4. It is to be appreciated that the steps completed within the portal may include calls for action outside of the portal (not shown), for example, actions such as application load & testing, operational readiness, and lifecycle management. The processing within the portal may provide controls for these actions, and it is to be appreciated that the seamless actions remove administrative oversight and downstream actions that may have been required from users under more traditional cloud service solutions.

While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
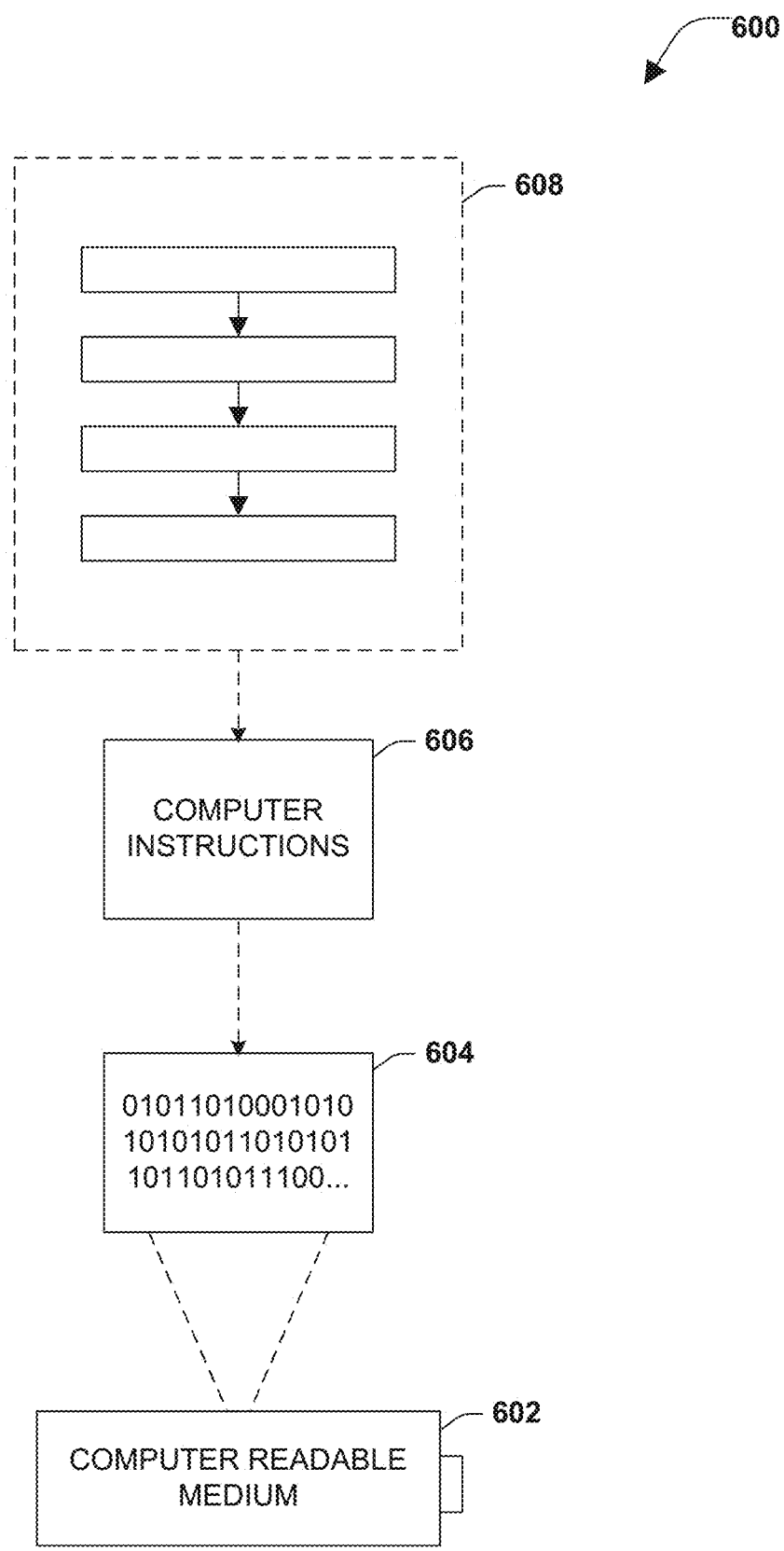
FIG. 6 is an illustration of an example computing environment where one or more of the provisions set forth herein can be implemented, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 602, such as a CD-R, DVD-R, flash drive, a platter of a hard disk drive, etc., on which is encoded computer-readable data 604. This computer-readable data 604, such as binary data including a plurality of zero's and one's as shown in 604, in turn includes a set of computer instructions 606 configured to operate according to one or more of the principles set forth herein. In one such embodiment 600, the processor-executable computer instructions 606 may be configured to perform a method 608, such as the method 100 of FIG. 1 or such as method 500 of FIG. 5. In another embodiment, the processor-executable instructions 606 may be configured to implement a system, such as the system 200 of FIG. 2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. Of course, many modifications may be made to this configuration without departing from the scope or spirit of the claimed subject matter.

Figure 7:
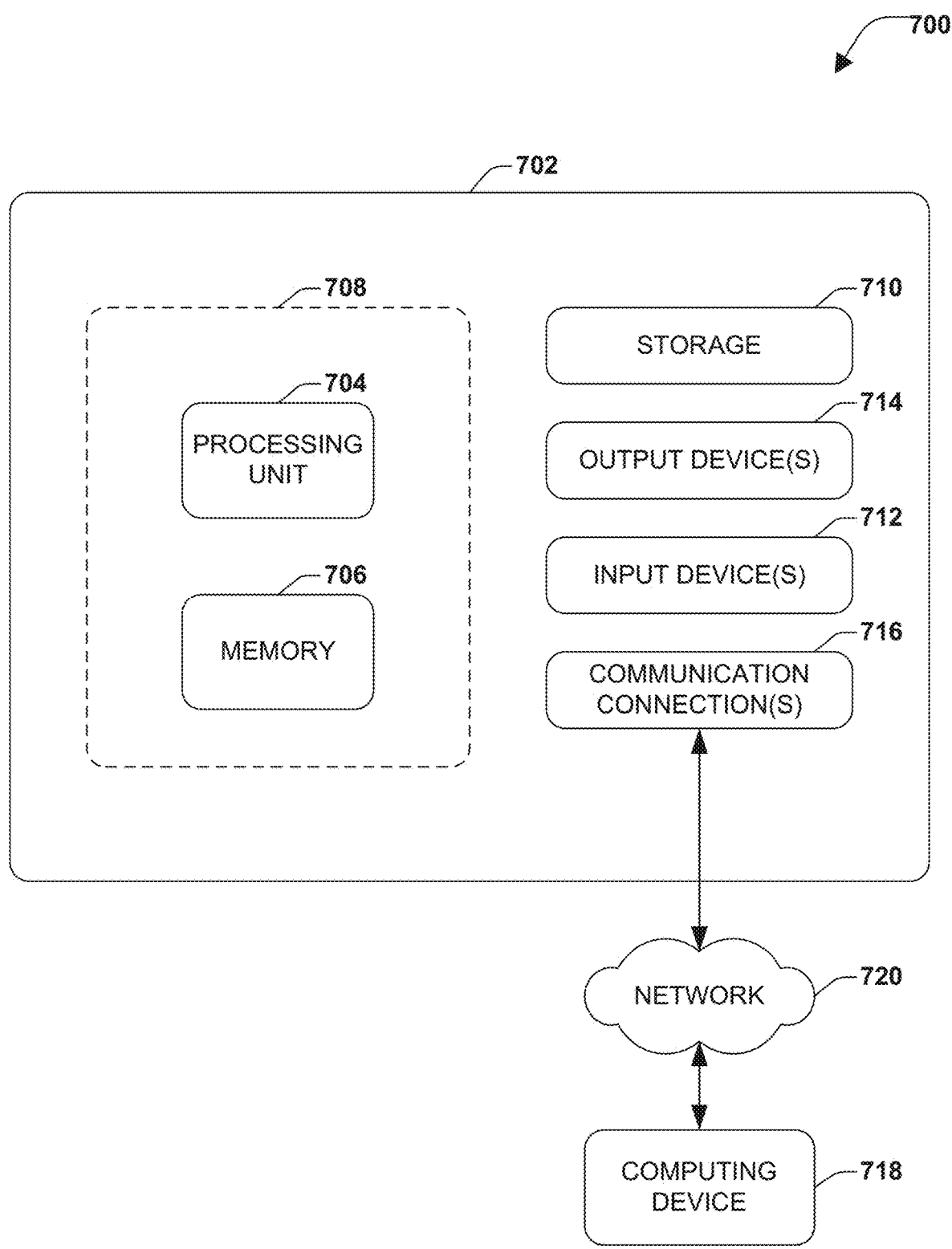
FIG. 7 is an illustration of an example computing environment where one or more of the provisions set forth herein can be implemented, according to one or more embodiments.

FIG. 7 and the following discussion provide a description of a suitable computing environment to implement embodiments of one or more of the provisions set forth herein. The operating environment of FIG. 7 is merely one example of a suitable operating environment and is not intended to suggest limitations as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, minicomputers, mainframe computers, distributed computing environments that include any of the above systems or devices, etc.

Generally, embodiments are described in the general context of "computer readable instructions" being executed by one or more computing devices. Computer readable instructions may be distributed via computer readable media as discussed herein. Computer readable instructions may be implemented as program modules, such as functions, objects, Application Programming Interfaces (APIs), data structures, and the like, that perform one or more tasks or implement one or more abstract data types. Typically, the functionality of the computer readable instructions is combined or distributed as desired in various environments.

FIG. 7 illustrates a system 700 including a computing device 702 configured to implement one or more embodiments provided herein. In one configuration, computing device 702 includes at least one processing unit 704 and memory 706. Depending on the exact configuration and type of computing device, memory 706 may be volatile, such as RAM, non-volatile, such as ROM, flash memory, etc., or a combination of the two. This configuration is illustrated in FIG. 7 by dashed line 708.

In other embodiments, device 702 includes additional features or functionality. For example, device 702 may include additional storage such as removable storage or non-removable storage, including, but not limited to, magnetic storage, optical storage, etc. Such additional storage is illustrated in FIG. 7 by storage 710. In one or more embodiments, computer readable instructions to implement one or more embodiments provided herein are in storage 710. Storage 710 may store other computer readable instructions to implement an operating system, an application program, etc. Computer readable instructions may be loaded in memory 706 for execution by processing unit 704, for example.

The term "computer readable media" as used herein includes computer storage media. Computer storage media includes volatile and nonvolatile, removable and non-removable media implemented in most any method or technology for storage of information such as computer readable instructions or other data. Memory 706 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or most any other medium which may be used to store the desired information, which may be accessed by device 702. Most any such computer storage media is part of device 702.

Device 702 includes input device(s) 712 such as keyboard, mouse, pen, voice input device, touch input device, infrared cameras, video input devices, or most any other input device. Output device(s) 714 such as one or more displays, speakers, printers, or most any other output device may be included with device 702. Input device(s) 712 and output device(s) 714 may be connected to device 702 via a wired connection, wireless connection, or most any combination thereof. In one or more embodiments, an input device or an output device from another computing device may be used as input device(s) 712 or output device(s) 714 for computing device 702. Device 702 may include communication connection(s) 716 to facilitate communications with one or more other devices 718, and such communication may occur over a network, for example network 720.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include most any combination thereof (e.g., A, B, or most any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    identifying one or more target users of a hybrid cloud service in response to a request for a hybrid cloud service solution;
    determining connections between the hybrid cloud service solution and one or more interacting systems based on the one or more target users, the request, one or more of an enterprise-wide rule and an industry-wide rule, and lifecycle control items including patch timing windows for patches to the hybrid cloud service solution;
    determining a timeframe for providing one or more of the determined connections;
    provisioning the hybrid cloud service solution in response to the request that integrates the determined connections;
    implementing the hybrid cloud service solution using a first set of hardware;
    monitoring operation of the hybrid cloud service solution and automatically implementing the hybrid cloud service solution using a second set of hardware to provide service during hardware repairs and to provide backup service;
    metering the determined connections of the hybrid cloud service solution to identify one or more third-party license agreements corresponding the determined connections;
    automatically patching the hybrid cloud service solution based on changes to enterprise-wide rules, industry-wide rules, and the patch timing windows; and
    automatically removing one or more of the determined connections of the hybrid cloud service solution based on the timeframe or based on a determination that a predetermined level of the one or more third-party license agreements has been exceeded, wherein the predetermined level comprises one or more of an expiration date of the license agreement, a contract definition of the license agreement, or a violation of a defined policy in the license agreement.

2. The method of claim 1, wherein the determined connections are at least one of security compliance, configuration compliance, asset management, software entitlements, business continuity, or financial reconciliation.

3. The method of claim 1, further comprising determining links to the determined connections.

4. The method of claim 1, further comprising automatically integrating business-level compliance factors.

5. The method of claim 1, further comprising provisioning a portal operable to receive the request for the hybrid cloud service, parse the request, and trigger subsequent action based on the request.

6. The method of claim 1, further comprising provisioning the hybrid cloud service solution that combines aspects of two or more of infrastructure-as-service, platform-as-a-service and software-as-a-service silos.

7. A system, comprising:
a processor coupled to a memory that includes instructions that, when executed by the processor, cause the processor to:
identify one or more target users of a hybrid cloud service in response to a request for a hybrid cloud service solution;
determine connections between the hybrid cloud service solution and one or more interacting systems based on the one or more target users, the request, one or more of an enterprise-wide rule and an industry-wide rule, and lifecycle control items including patch timing windows for patches to the hybrid cloud service solution;
determine a timeframe for providing one or more of the determined connections;
provision the hybrid cloud service solution in response to the request that integrates the determined connections;
implement the hybrid cloud service solution using a first set of hardware;
monitor operation of the hybrid cloud service solution and automatically implementing the hybrid cloud service solution using a second set of hardware to provide service during hardware repairs and to provide backup service;
meter the determined connections of the hybrid cloud service solution to identify one or more third-party license agreements corresponding the determined connections;
automatically patch the hybrid cloud service solution based on changes to enterprise-wide rules, industry-wide rules, and the patch timing windows; and
automatically remove one or more of the determined connections of the hybrid cloud service solution based on the timeframe or based on a determination that a predetermined level of the one or more third-party license agreements has been exceeded, wherein the predetermined level comprises one or more of an expiration date of the license agreement, a contract definition of the license agreement, or a violation of a defined policy in the license agreement.

8. The system of claim 7, wherein the instructions further cause the processor to provision a portal to accept, parse, and approve or deny the request.

9. The system of claim 7, wherein the instructions further cause the processor to automatically integrate business level compliance factors.

10. The system of claim 7, wherein the determined connections comprise at least one of security compliance, configuration compliance, asset management, software entitlements, business continuity, or financial reconciliation.

11. A computer-readable storage medium that comprises instructions that, when executed by a processor, cause the processor to perform operations comprising:
identifying one or more target users of a hybrid cloud service in response to a request for a hybrid cloud service solution;
determining connections between the hybrid cloud service solution and one or more interacting systems based on the one or more target users, the request, one or more of an enterprise-wide rule and an industry-wide rule, and lifecycle control items including patch timing windows for patches to the hybrid cloud service solution;
determining a timeframe for providing one or more of the determined connections;
provisioning the hybrid cloud service solution in response to the request that integrates the determined connections;
implementing the hybrid cloud service solution using a first set of hardware;
monitoring operation of the hybrid cloud service solution and automatically implementing the hybrid cloud service solution using a second set of hardware to provide service during hardware repairs and to provide backup service;
metering the determined connections of the hybrid cloud service solution to identify one or more third-party license agreements corresponding the determined connections;
automatically patching the hybrid cloud service solution based on changes to enterprise-wide rules, industry-wide rules, and the patch timing windows; and
automatically removing one or more of the determined connections of the hybrid cloud service solution based on the timeframe or based on a determination that a predetermined level of the one or more third-party license agreements has been exceeded, wherein the predetermined level comprises one or more of an expiration date of the license agreement, a contract definition of the license agreement, or a violation of a defined policy in the license agreement.

12. The computer-readable storage medium of claim 11, wherein the operations further comprise automatically integrating business-level compliance factors into the hybrid cloud service solution.

\* \* \* \* \*